Figure 1:
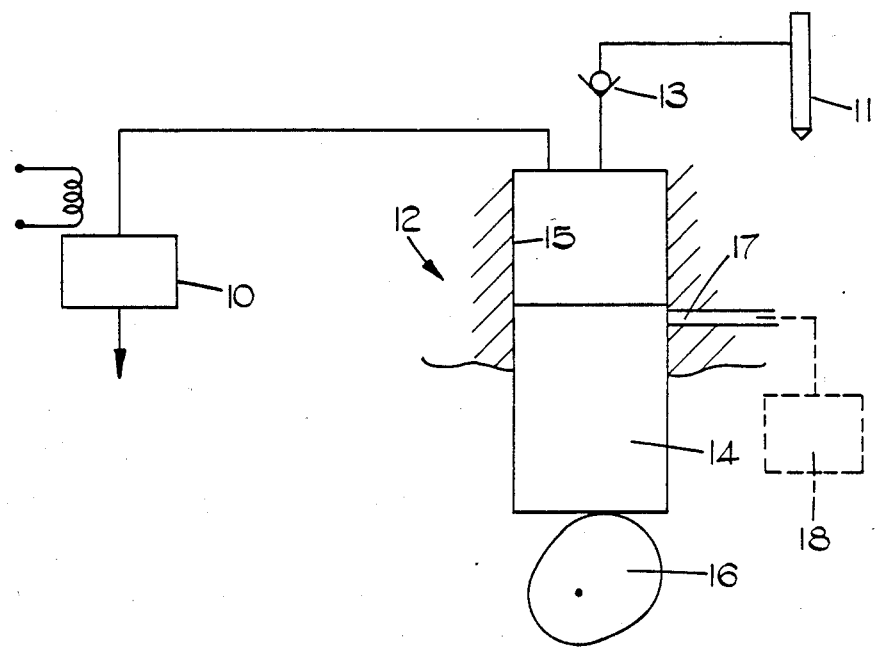

United States Patent [19]

Harris

[11] Patent Number: 4,580,760
[45] Date of Patent: Apr. 8, 1986

[54] FLUID CONTROL VALVES

[75] Inventor: Kenneth M. Harris, London, England

[73] Assignee: Lucas Industries plc, Birmingham, England

[21] Appl. No.: 578,129

[22] Filed: Feb. 8, 1984

[30] Foreign Application Priority Data

Feb. 26, 1983 [GB] United Kingdom ................ 8305408

[51] Int. Cl.$^4$ ........................ F16K 31/44; F16K 31/02
[52] U.S. Cl. .................................. 251/77; 251/129.20
[58] Field of Search ...................... 251/75, 77, 81, 129, 251/138, 58, 284, 63.4, 129.20, 129.16; 137/243.3, 243.2

[56] References Cited

U.S. PATENT DOCUMENTS

| | | | |
|---|---|---|---|
| 802,956 | 10/1905 | Waterman | 251/138 |
| 2,833,508 | 5/1958 | Bydalek et al. | 251/138 |
| 2,953,123 | 9/1960 | Reen et al. | 137/625.64 |
| 3,053,497 | 9/1962 | Fraenkel | 251/ |
| 3,167,094 | 1/1965 | Castelijns | 251/ |
| 3,523,556 | 8/1970 | Worrall | 137/625.65 |
| 3,625,477 | 12/1971 | Vogel | 251/141 |
| 3,630,482 | 12/1971 | Beller | 251/129 |
| 4,120,596 | 10/1978 | Kunkle | 251/77 |
| 4,197,518 | 4/1980 | Seilly et al. | 251/129 |
| 4,251,052 | 2/1981 | Hertfelder et al. | 251/129 |
| 4,254,935 | 3/1981 | Jarrett | 251/141 |
| 4,268,009 | 5/1981 | Allen, Jr. | 251/138 |
| 4,333,492 | 6/1982 | West | 251/63.4 |
| 4,449,691 | 5/1984 | Führer et al. | 251/85 |
| 4,484,727 | 11/1984 | Harris et al. | 251/129 |
| 4,540,155 | 9/1985 | Redston et al. | 251/77 |

FOREIGN PATENT DOCUMENTS

| | | | |
|---|---|---|---|
| 2227551 | 6/1971 | Fed. Rep. of Germany | 251/129 |
| 2014087 | 12/1977 | Fed. Rep. of Germany | 251/77 |
| 0046176 | 4/1981 | Japan | 137/625.65 |

Primary Examiner—Samuel Scott
Assistant Examiner—Helen Ann Odar

[57] ABSTRACT

An electromagnetically operable fluid control valve includes a valve member slidable in a bore coupled to the armature of an electromagnetic device which includes a stator structure. The armature is of cup shaped form and is coupled to the valve member by a flange on the armature which is trapped between a pair of spaced plates carried by the valve member. The distance between the plates is determined by a spacer slightly thicker than the flange and smaller than the flange to allow for slight misalignment of the armature and the valve member.

7 Claims, 2 Drawing Figures

FLUID CONTROL VALVES

This invention relates to electromagnetically operable fluid control valves more particularly but not exclusively, for use in fuel injection pumping apparatus of the kind intended to supply fuel to an internal combustion engine.

There is an increasing demand in the field of fuel injection equipment for valves which can be operated at high repetition rates and which can handle fuel at high pressures. The reason for this is that electronic control equipment is better able to take into account various engine operating parameters and desired operating parameters than for example mechanical or hydraulically actuated equipment. Such valves will in use, be expected to operate for extended periods without service and will operate at high repetition rates.

The object of the invention is to provide a fluid control valve in a simple and convenient form.

According to the invention an electromagnetically operable fluid control valve comprises, a valve body defining a bore, a seating in the bore and a valve member slidable in the bore and shaped for co-operation with said seating, one end of the valve member in the closed position thereof projecting from said bore, a retaining member carried by the valve member and extending from said one end thereof, an electromagnetic device including a stator structure and a hollow cylindrical armature, said armature defining a right cylindrical portion, a bearing member defining a right cylindrical surface which co-operates with said right cylindrical portion to guide the axial movement of the armature, an inwardly extending flange formed on said right cylindrical portion of the armature, said flange being located between a stop plate and abutment plate located about said retaining member with the stop plate being located against the valve member, an annular distance piece located between said plates, said distance piece having a thickness slightly greater than that of the flange and an external diameter less than that of the internal surface of the flange, means on the retaining member to maintain said plates and distance piece in assembled relationship, and resilient means acting between said abutment plate and said stator structure, said resilient means acting to bias the valve member to the open position, the open position of the valve member being determined by contact between said stop plate and the valve body.

Figure 2:
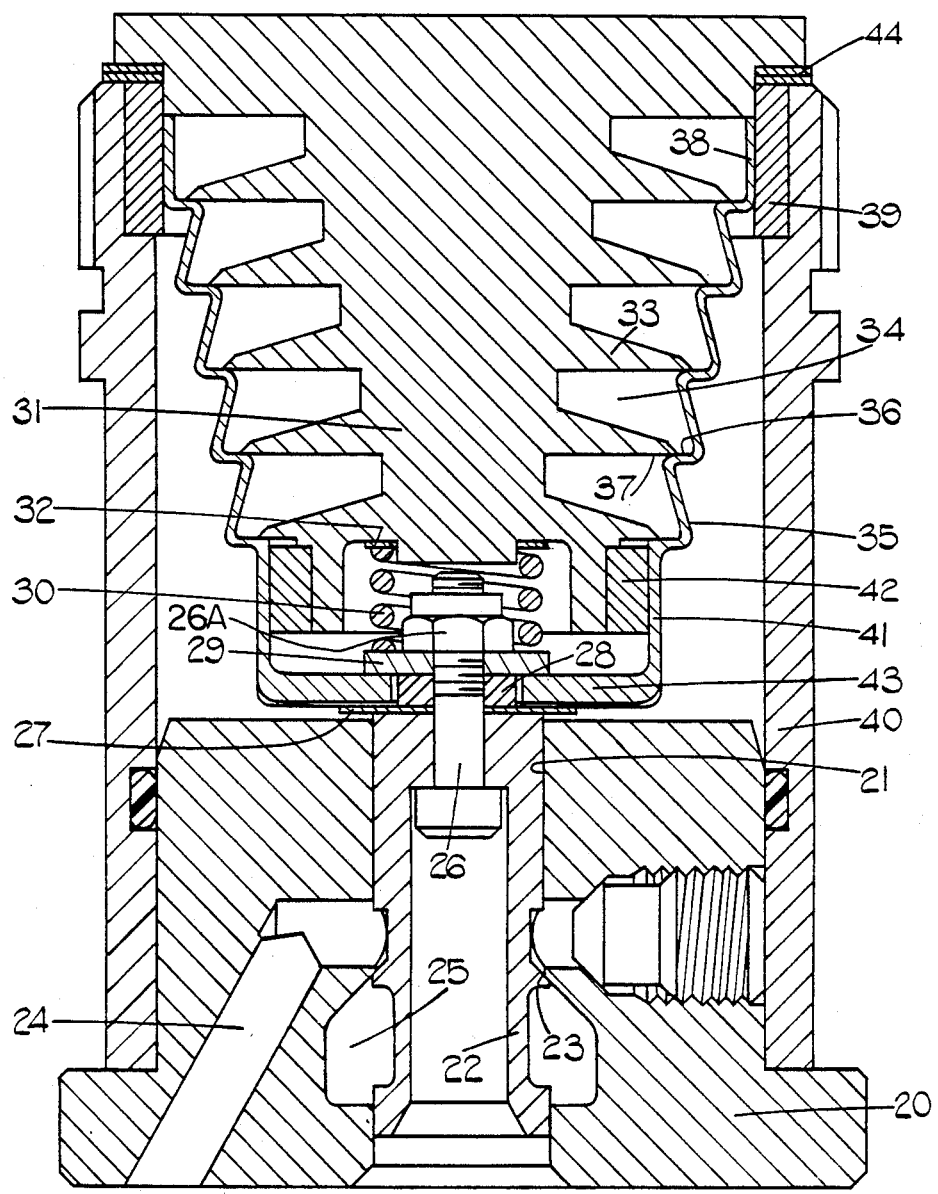

In the accompanying drawings:

FIG. 1 is a block diagram of a fuel pumping apparatus incorporating a valve, and FIG. 2 shows an example of valve.

Referring to FIG. 1 of the drawings the electromagnetically operated valve is shown at 10 and is incorporated in a fuel pumping apparatus for supplying fuel to an injection nozzle 11 of a compression ignition engine. Fuel under pressure is supplied by a cam operated fuel pump 12, the pumping chamber of which is connected to the injection nozzle 11 which connection may include a non-return delivery valve 13. The pumping chamber can also be placed in communication with a drain by way of the valve 10.

The pump 12 includes a piston 14 movable inwardly to displace fuel from the cylinder 15 in which it is located, by means of an engine driven cam 16. Outward movement of the plunger is effected by the action of a spring not shown. Formed in the wall of the cylinder is a fuel supply port 17 which is connected to a source 18 of fuel at a low pressure and in use, as the plunger is moved inwardly with the valve 10 closed, fuel will be displaced to the nozzle 11 by way of the delivery valve as soon as the port 17 is covered by the plunger. If during the inward movement of the plunger the valve 10 is opened, fuel will flow to a drain by way of the valve rather than to the nozzle. The valve 10 may be opened during the initial movement of and closed when the plunger has moved inwardly to a predetermined position. The length of stroke of the plunger 14 after the port 17 is closed and while the valve 10 is closed determines the amount of fuel supplied to the injection nozzle.

Turning now to FIG. 2 of the drawings, this shows in its entirety, the electromagnetically operable valve. The valve has a valve body 20 which defines a bore 21 and slidable in the bore is a valve member 22. The valve member is shaped to co-operate with a seating 23 and when the valve member is lifted from the seating flow of fuel can take place from a passage 24 into a chamber 25 where it can flow to a drain. The valve member 22 in the closed position, as shown, extends slightly from the bore 21. Secured to the valve member by means of a retaining member in the form of a bolt 26 and nut 26A is the assembly of a stop plate 27, a distance piece 28 and a spring abutment plate 29. Engaging with the abutment plate 29 is one end of a coiled compression spring 30 the other end of which locates about a spigot portion defined on a stator structure 31. A shim 32 is located between the end of the spring and the stator whereby the force exerted by the coiled compression spring can be adjusted. The stator defines a plurality of axially spaced circumferential pole pieces 33 between which are defined grooves 34 which accommodate windings not shown. The windings are so arranged that when supplied with electric current adjacent pole pieces 33 will assume opposite magnetic polarity.

Also provided is a hollow cylindrical armature 35 which defines pole faces 36 presented to pole faces 37 defined by the pole pieces 33 respectively. The armature 35 at its end remote from the valve member defines a right cylindrical portion 38 which forms a bearing with an insert 39 which is carried by a valve housing 40. Moreover, at its opposite end the armature has a further right cylindrical portion 41 which is located about a bearing ring 42 carried by an extension of the stator structure. In addition, the portion 41 of the armature terminates in an inwardly extending flange portion 43 which locates between the stop plate 27 and the spring abutment 29, the thickness of the flange portion 43 being slightly less than that of the spacer member 28. An annular clearance is provided between the spacer member 28 and the inner peripheral surface of the flange portion 43 to allow for slight misalignment of the armature and the valve member.

In operation, when the windings are deenergised the spring 30 moves the valve member to the open position, the extent of movement of the valve member being limited by the abutment of the stop plate 27 with the end surface of the valve body 20. This also halts the movement of the armature. When the windings are energised the limited clearance between the spring abutment 29 and the flange portion 43 of the armature is taken up prior to movement of the valve member to the position in which it is shown. In this fully energized condition no air gap exists between the faces 36 and 37 and the initial adjustment of the air gaps between the faces 36 and 37 can be adjusted by means of shims 44 which are positioned between a flange on the stator structure 31 and the housing 40.

I claim:

1. An electromagnetically operable fluid control valve comprising a valve body defining a bore, an annular seating within the bore and a valve member slidable in and extending within the bore and shaped for co-operation with said seating, one end of the valve member in the closed position thereof projecting from one end of said bore, a retaining member carried by the valve member and extending from said one end thereof, an electromagnetic device including a stator structure and a hollow armature surrounding the stator structure, said armature defining a hollow cylindrical portion, a bearing member on the stator structure defining a cylindrical surface which co-operates with said cylindrical portion of the armature to guide the axial movement of the armature, an annular flange within said hollow cylindrical portion of the armature, a stop plate and an abutment plate located about said retaining member with the stop plate being located against the valve member, said flange being located between said plates, an annular distance piece located between said plates, said distance piece having a thickness slightly greater than that of the flange and an external diameter less than that of the internal surface of the flange, means on the retaining member to maintain said plates and distance piece in assembled relationship, and resilient means acting between said abutment plate and said stator structure, said resilient means acting to bias the valve member to the open position, the open position of the valve member being determined by contact between said stop plate and the valve body.

2. A fluid control valve according to claim 1 in which said resilient means comprises a coiled compression spring one end of which bears against said spring abutment and the other end of which bears against said stator structure.

3. A fluid control valve according to claim 2 including a shim disposed between said other end of the spring and said stator structure.

4. A fluid control valve according to claim 3 including a spigot defined by said stator structure and about which said other end of the spring is located.

5. A fluid control valve according to claim 1 in which said stator structure defines a plurality of radial pole faces, the armature defining complementary pole faces, the pole faces of the armature and stator structure engaging with each other in the closed position of the valve.

6. A fluid control valve according to claim 5 including a housing mounting the valve body and the stator structure, said stator structure defining a radial flange locating against a step defined by the housing, and a shim disposed between said flange and said step whereby the axial position of the stator strucutre and housing can be adjusted.

7. A flid control valve according to claim 6 including a cylindrical surface defined by the armature and an insert carried by the housing said insert defining a bearing surface engageable by the external surface of said cylindrical portion of the armature.

* * * * *